US010953535B2

(12) United States Patent
Karmatz

(10) Patent No.: US 10,953,535 B2
(45) Date of Patent: Mar. 23, 2021

(54) COMPACTING GRIP FOR HANDHELD DEVICES

(71) Applicant: Michael Shayne Karmatz, Melville, NY (US)

(72) Inventor: Michael Shayne Karmatz, Melville, NY (US)

( * ) Notice: Subject to any disclaimer, the term of this patent is extended or adjusted under 35 U.S.C. 154(b) by 0 days.

(21) Appl. No.: 16/905,042

(22) Filed: Jun. 18, 2020

(65) Prior Publication Data

US 2020/0316768 A1 Oct. 8, 2020

Related U.S. Application Data

(60) Division of application No. 16/507,994, filed on Jul. 10, 2019, now Pat. No. 10,800,024, which is a continuation of application No. 13/165,428, filed on Jun. 21, 2011, now Pat. No. 10,406,671, which is a continuation-in-part of application No. 12/912,284, filed on Oct. 26, 2010, now Pat. No. 8,844,098.

(Continued)

(51) Int. Cl.

| | |
|---|---|
| ***B25G 1/10*** | (2006.01) |
| ***B25G 1/04*** | (2006.01) |
| ***A45F 5/10*** | (2006.01) |
| ***A41D 19/00*** | (2006.01) |
| ***A45C 11/00*** | (2006.01) |
| ***H04M 1/04*** | (2006.01) |

(52) U.S. Cl.

CPC ............... *B25G 1/04* (2013.01); *B25G 1/102* (2013.01); *A45C 11/00* (2013.01); *A45F 5/10* (2013.01); *A45F 2005/1006* (2013.01); *A45F 2200/05* (2013.01); *Y10T 16/44* (2015.01); *Y10T 16/473* (2015.01); *Y10T 16/476* (2015.01)

(58) Field of Classification Search

CPC ...... A45F 5/00; A45F 5/10; A45F 2005/1006; A45F 2005/108; A45F 2200/05; A45F 2005/106; B25G 1/04; B25G 1/102; Y10T 16/44; Y10T 16/473; A45C 11/00; H04M 1/04; H04B 1/3888

See application file for complete search history.

(56) References Cited

U.S. PATENT DOCUMENTS

| | | | | |
|---|---|---|---|---|
| 4,211,445 A * | 7/1980 | Woods | A46B 5/04 294/187 |
| 8,186,642 B2 * | 5/2012 | Weiss-Vons | B65H 75/143 248/683 |

(Continued)

*Primary Examiner* — Tan Le

(57) ABSTRACT

An apparatus for gripping a handheld device is provided. The apparatus includes a base for affixing the apparatus to a first surface of the handheld device; at least one extension extending from the base at a first end of the extension; and a grip extending from the at least one extension at a second end of the extension, wherein the grip is oriented substantially parallel to the first surface of the handheld device, wherein the apparatus is adapted to receive a portion, of at least one finger inserted between the grip and the handheld device, wherein the apparatus is adapted to receive a portion of each of two fingers inserted between the grip and the handheld device at opposite sides of the at least one extension, and wherein the grip is movable into at least one angled position where one end of the grip is pointed towards the base while an opposite end of the grip is pointed away from the base.

2 Claims, 32 Drawing Sheets

Related U.S. Application Data

(60) Provisional application No. 61/375,096, filed on Aug. 19, 2010.

(56) References Cited

U.S. PATENT DOCUMENTS

| | | | | |
|---|---|---|---|---|
| 8,737,066 | B1 * | 5/2014 | Block | A45F 5/00<br>361/679.59 |
| 9,300,346 | B2 * | 3/2016 | Hirsch | A45F 5/00 |
| 10,244,854 | B1 * | 4/2019 | Haber | A45F 5/10 |
| 2007/0181620 | A1 * | 8/2007 | Carver, III | H04B 1/385<br>224/217 |

* cited by examiner

COMPACTING GRIP FOR HANDHELD DEVICES

RELATED APPLICATION INFORMATION

This application is a continuation of application Ser. No. 16/507,994 filed on Jul. 10, 2019. Application Ser. No. 16/507,994 is a continuation of application Ser. No. 13/165,428 filed Jun. 21, 2011 for "Apparatus for gripping handheld devices," Now U.S. Pat. No. X, which is a continuation-in-part of application Ser. No. 12/912,284 filed Oct. 26, 2010 for "Apparatus for gripping handheld devices," now U.S. Pat. No. 8,844,098, which claims priority from Application No. 61/375,096 filed Aug. 19, 2010 for "Holding Method for Handheld Device."

BACKGROUND OF THE INVENTION

Field of the Invention

The present invention relates generally to an apparatus for holding handheld devices. More particularly, the present invention relates to a movable grip for holding handheld devices.

Description of the Related Art

Recently, the use of handheld electronic devices such, as Personal Digital Assistants (PDAs) and smartphones, has increased significantly. In particular, due to increased usage of large touch-screen displays, larger bar-shaped devices, which are commonly shaped as a single, rectangular box, are becoming more commonly used, in contrast to other forms of handheld devices including flip, rotating, and sliding handheld devices, which generally include at least two bodies connected together. Unlike the bar-shaped devices many of these other devices are designed to be comfortably and securely held by a user with two hands while operating the devices.

However, the design of many devices, including bar-shaped devices, for example, although allowing a user to easily access a large touch screen, may create difficulty for users to securely grip these devices with a single hand, which results in users frequently dropping and damaging their devices.

FIG. 1 is a diagram illustrating a conventional handheld device gripped by a user's hand.

Referring to FIG. 1, when a user securely grips, a handheld device 10 with a user's fingers extending around a back and side of the handheld device 10, a range of motion of the user's thumb is limited with respect to a front surface of the device. When the handheld device 10 includes controls, such as buttons, wheels, a touchscreen, etc. throughout a front surface and/or sides of the handheld device 10, a user may not be able to access the controls with a user's thumb in this orientation. More specifically, the user's thumb may only move with respect to the handheld device 10 through the joints of the thumb.

In order to reach other areas of the front surface of the handheld device 10 with the user's thumb, a user must either reposition the device with a similar grip, in which top or bottom fingers may no longer grip the device, or a user must use a relaxed grip, in which a user's fingers do not extend around both the back and side of the device. In either case, a user must grip the handheld device 10 less securely and/or shift the handheld device 100 with respect to the user's hand in order for a user to access an entire range of the front surface and/or sides of the device with the user's thumb. Therefore, a user may not easily operate a handheld device 10 with one hand, while securely gripping the device with the user's fingers.

Therefore, there is a need for an apparatus for securely holding devices such as bar-shaped devices, with a single hand while allowing greater range of movement of a user's fingers while holding the device.

SUMMARY OF THE INVENTION

Accordingly, the present invention has been made to solve at least the abovementioned problems occurring in the prior art, and the present invention provides a finger grip apparatus for a handheld device. The finger grip apparatus allows a user to securely hold a handheld device with a single hand. For a touch-screen device, the finger grip apparatus allows a user to both hold a device and provide user input to a touch screen with a single hand with an increased range of motion compared with gripping the handheld device directly.

According to an embodiment of the present invention an apparatus for gripping a handheld device is provided. The apparatus includes a base for affixing the apparatus to a first surface of the handheld device; at least one extension extending from the base at a first end of the extension; and a grip extending from the at least one extension at a second end of the extension, wherein the grip is oriented substantially parallel to the first surface of the handheld device, wherein the apparatus is adapted to receive a portion of at least one finger inserted between the grip and the handheld device, and wherein the apparatus is adapted to receive a portion of each of two fingers inserted between the grip and the handheld device at opposite sides of the at least one extension, and wherein the grip is movable into at least one angled position where one end of the grip is pointed towards the base while an opposite end of the grip is pointed away from the base.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
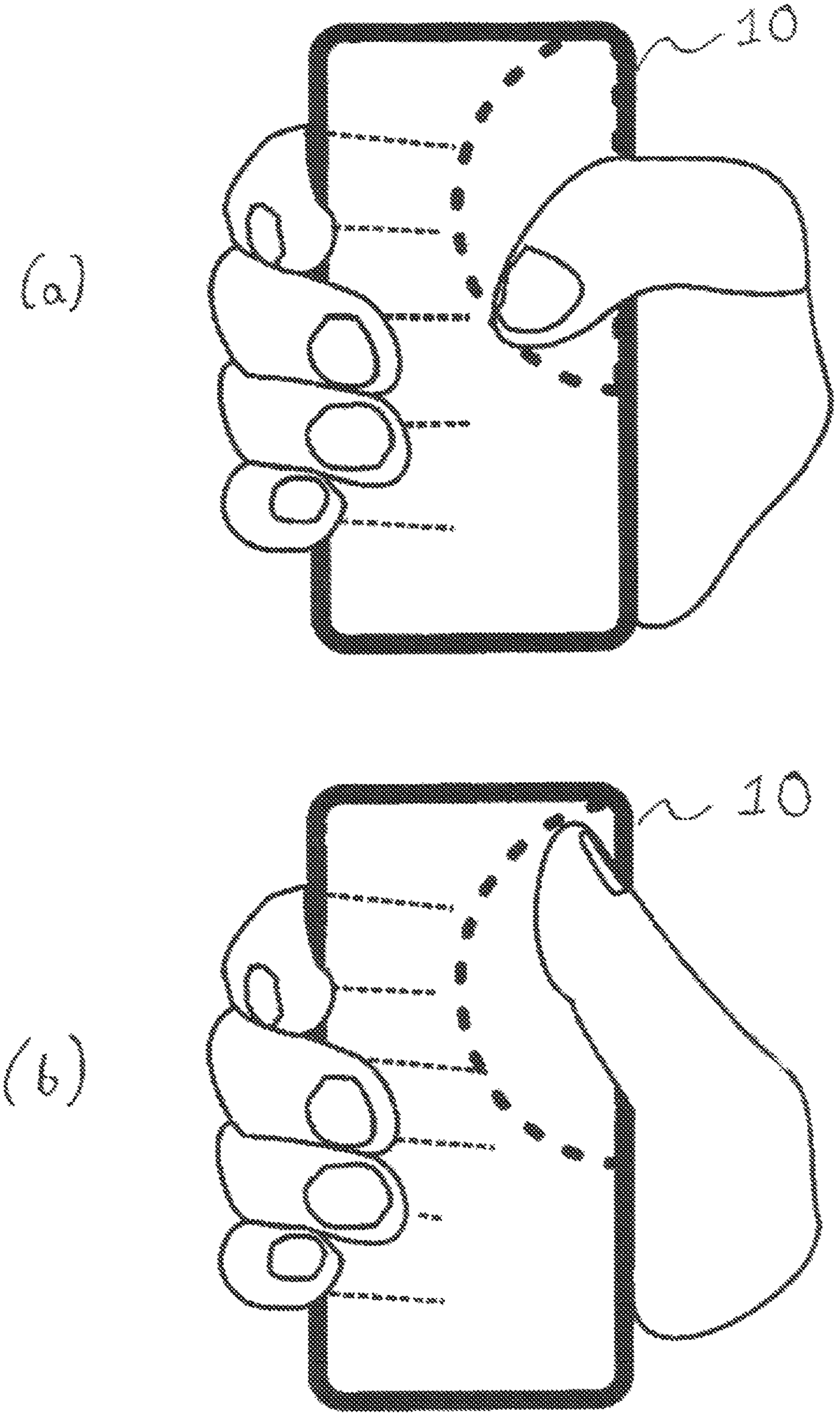
FIG. 1 PRIOR ART
FIG. 1 is a diagram illustrating a conventional handheld device gripped by a user's hand.

Hereinafter, various embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a description of known functions and configurations incorporated herein, will be omitted when it may make the subject matter of the present invention rather unclear.

FIGS. 2 through 10 are diagrams illustrating grip devices according to embodiments of the present invention.

Figure 2:
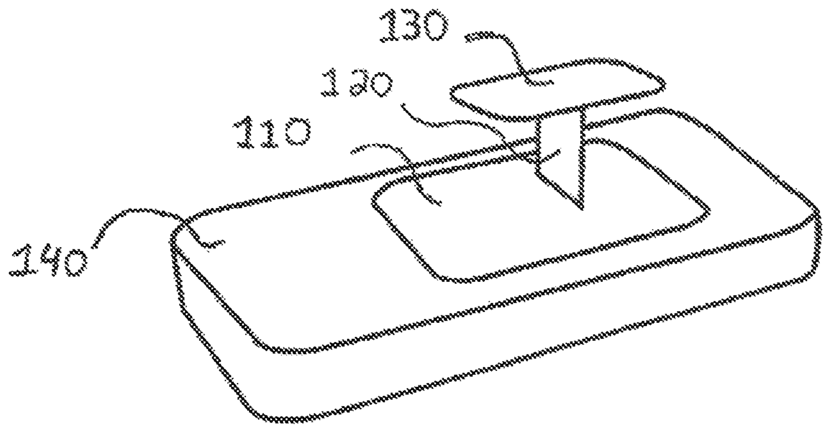
FIG. 2 is a diagram illustrating a grip device in an open position according to an embodiment of the present invention.

Referring to FIG. 2, a grip device includes a base 110, an extension 120, and a grip 130.

Figure 4:
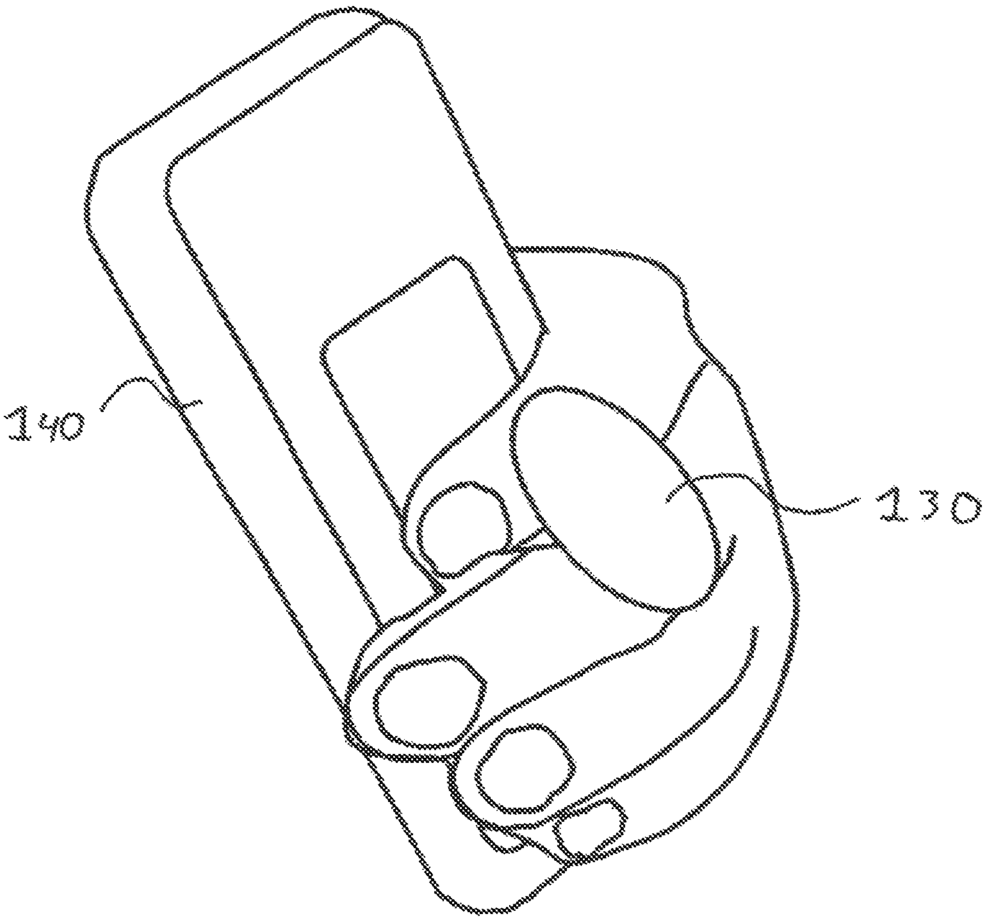
FIGS. 4 to 8 are diagrams illustrating grip devices with various grip configurations according to other embodiments of the present invention.

The base 110 is used to fasten the grip device to a handheld device 140. The handheld device 140 may be an electronic device such as a mobile phone Personal Digital Assistant (PDA), portable music player, portable video player, handheld computer, tablet computer, electronic book reader, netbook computer, etc., but is not limited thereto. Holding a handheld device 140 with the assistance of the grip device allows users to more easily grip the handheld device, including users with arthritis or other muscle or nervous system disorders that may otherwise increase difficulty in holding such devices, As shown in FIG. 4, when the handheld device 140 is a touchscreen device, the finger grip apparatus allows a user to rest fingertips along the back of the handheld device 140 instead of wrapping fingers around an entire back of the handheld device 140. This positioning allows a user's thumb to more easily reach an entire range of a touch screen, thereby allowing a user to more easily operate a touchscreen device with a single hand.

Also, although a bar-style handheld device 140 is depicted in FIG. 2, the present invention may also be applied to handheld devices of other forms, including flip-style, rotating-style, and sliding-style handheld devices.

The base 110 may be formed as a plate or other shape, removably or permanently affixed to the handled device by an adhesive or other mounting hardware such as screws or rivets (not shown). An upper surface of the base 110 may have flat or curved upper and/or lower surfaces, which may correspond to the shape of adjacent surfaces of the handheld device 140. Although the base 110 illustrated in FIG. 2 is flat and has a substantially rectangular shape, various other shapes, such as a circle, ellipse, or other irregular shapes, including ergonomic shapes designed to rest against a user's fingers, may be used in accordance with embodiments of the present invention. The base 110 may also be integrated into a removable protective case, clip-on, or slide-on attachment/accessory for the handheld device 140.

Figure 3:
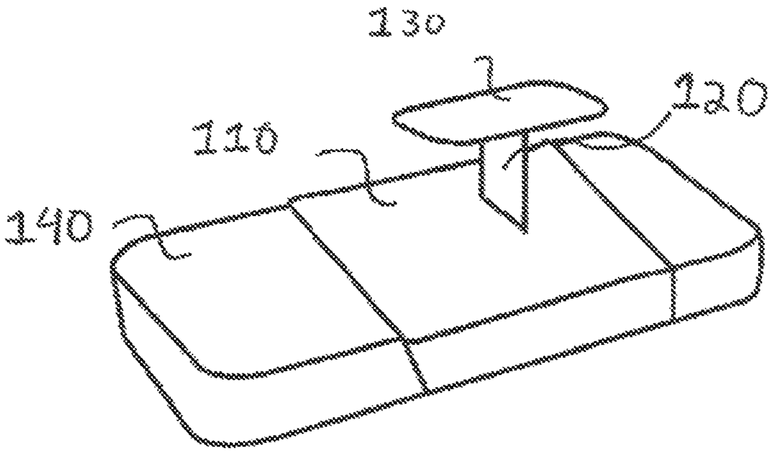
FIG. 3 is a diagram illustrating a grip device having a base integrated into a sleeve of a handheld device according to an embodiment of the present invention.

According to various embodiments of the present invention, the base 110 may be integrated into the body of the handheld device 140, or integrated into removable components of the handheld device 140. For example, the base 110 may be integrated into a removable battery cover of the handheld device 140. For example, FIG. 3 illustrates a handheld device having a base 110 that partially covers a back and at least one other side of the handheld device. However, the base 110 may also completely cover one or more sides or surfaces of a device in accordance with embodiments of the present invention.

The base 110 may protrude from an exterior surface the handheld device 140, or may be affixed to a recess in an upper surface of the handheld device 140 in accordance with embodiments of the present invention. For example, the base may be affixed to a recess in an upper surface of the handheld device 140 such that an exposed surface of the base 110 may be flush with an exposed surface of the handheld device 140 when affixed to the handheld device 140, such as illustrated in FIG. 2.

Figure 5:
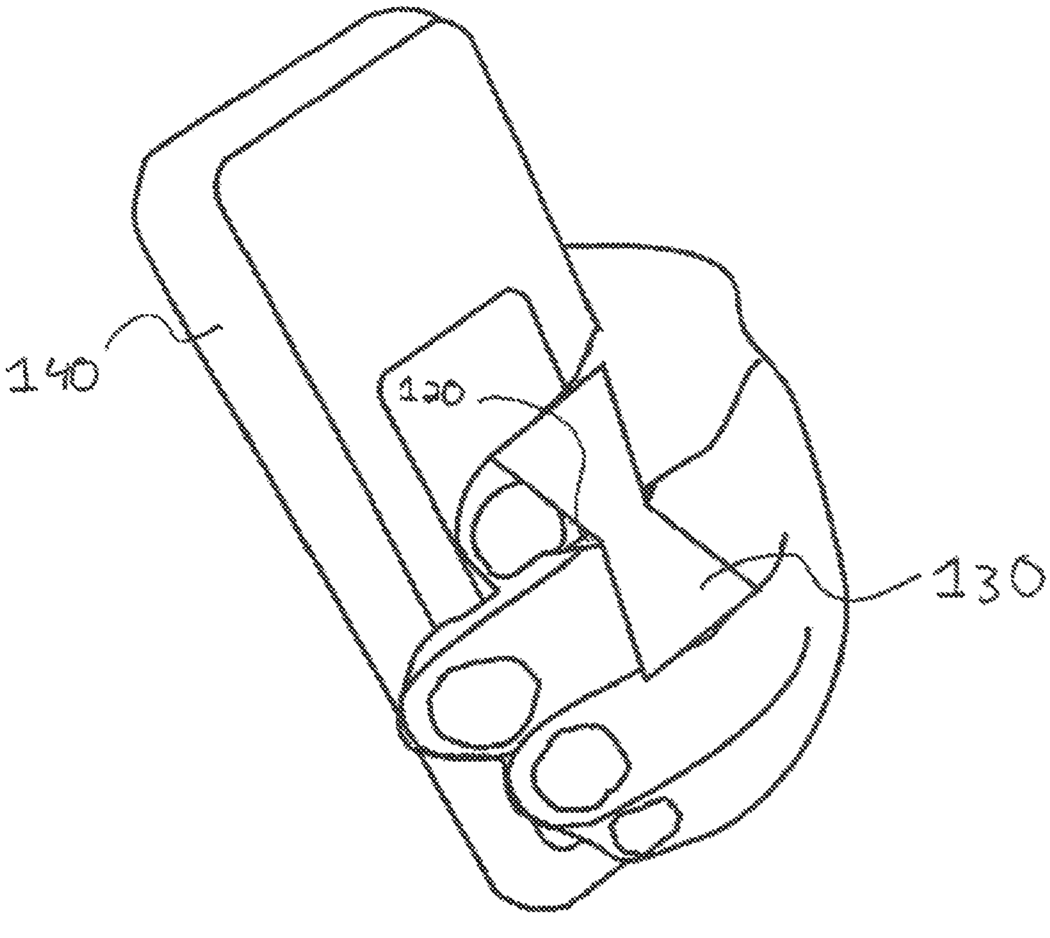
Figure 6:
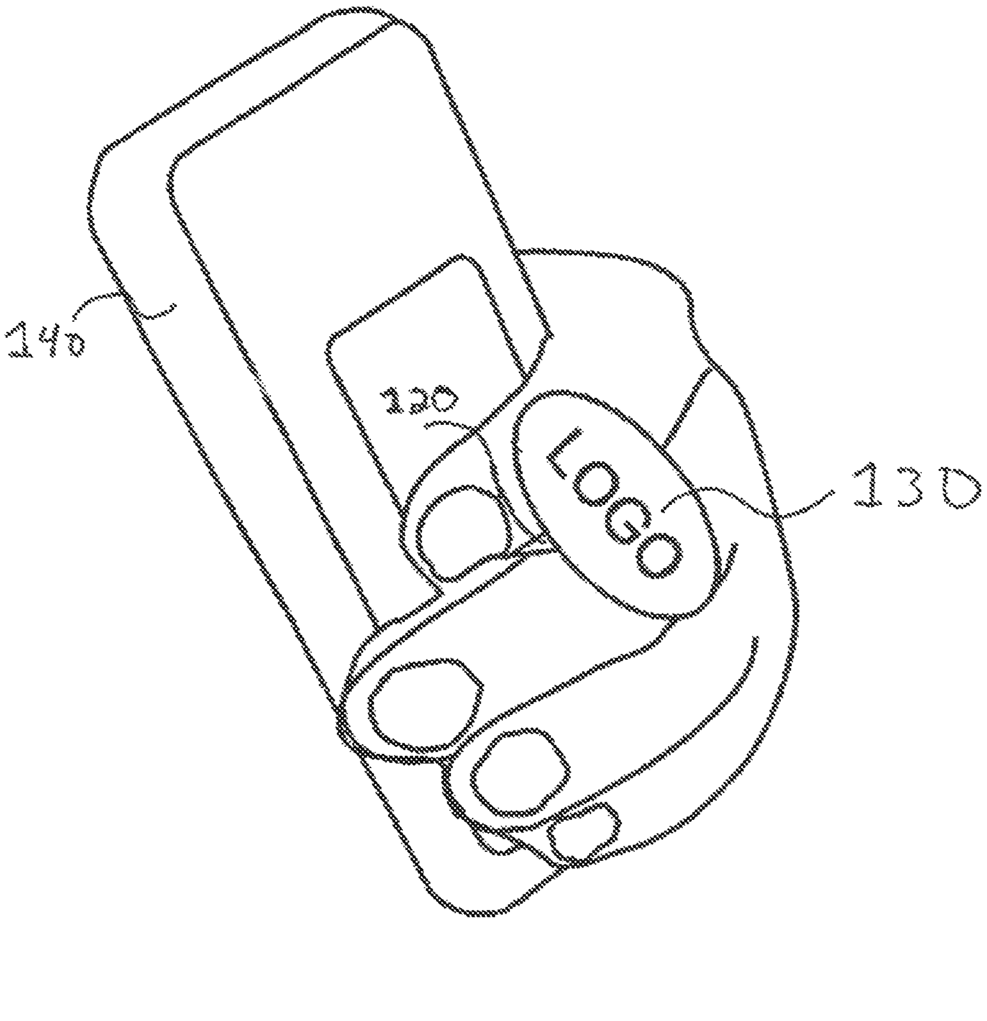
Figure 7A:
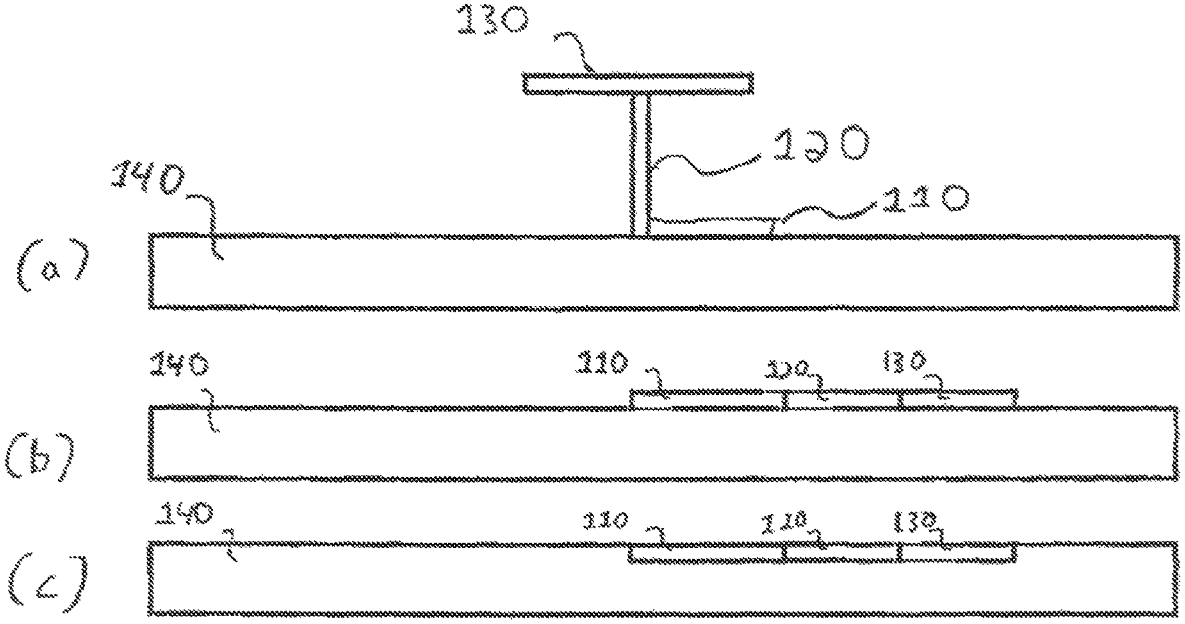
Figure 7B:
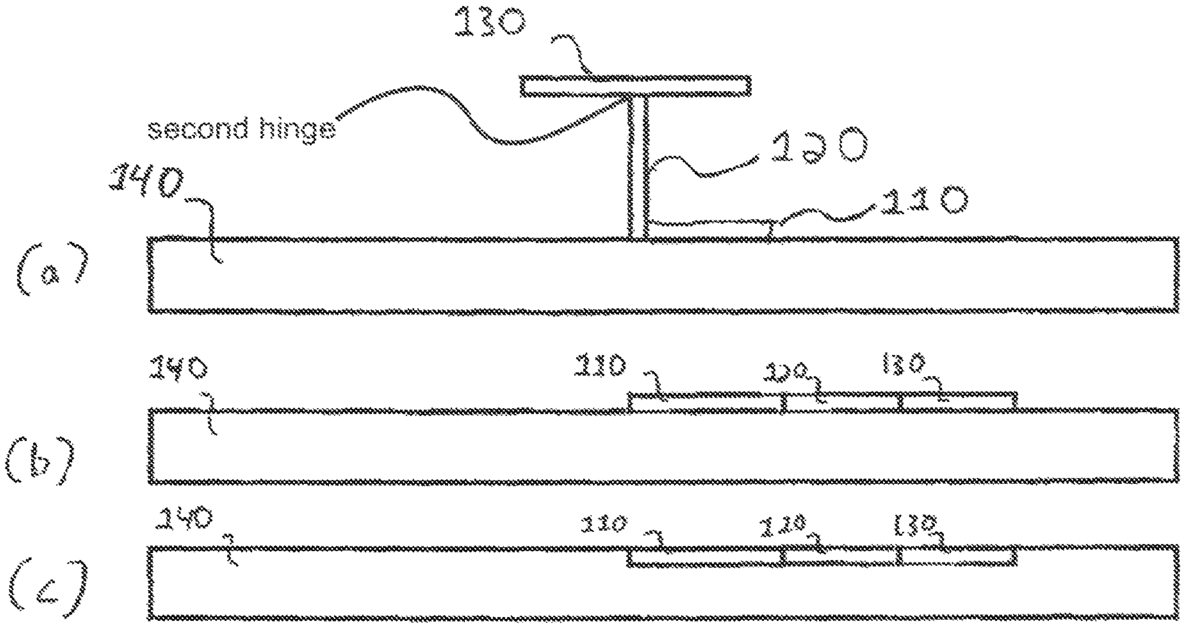
Figure 8:
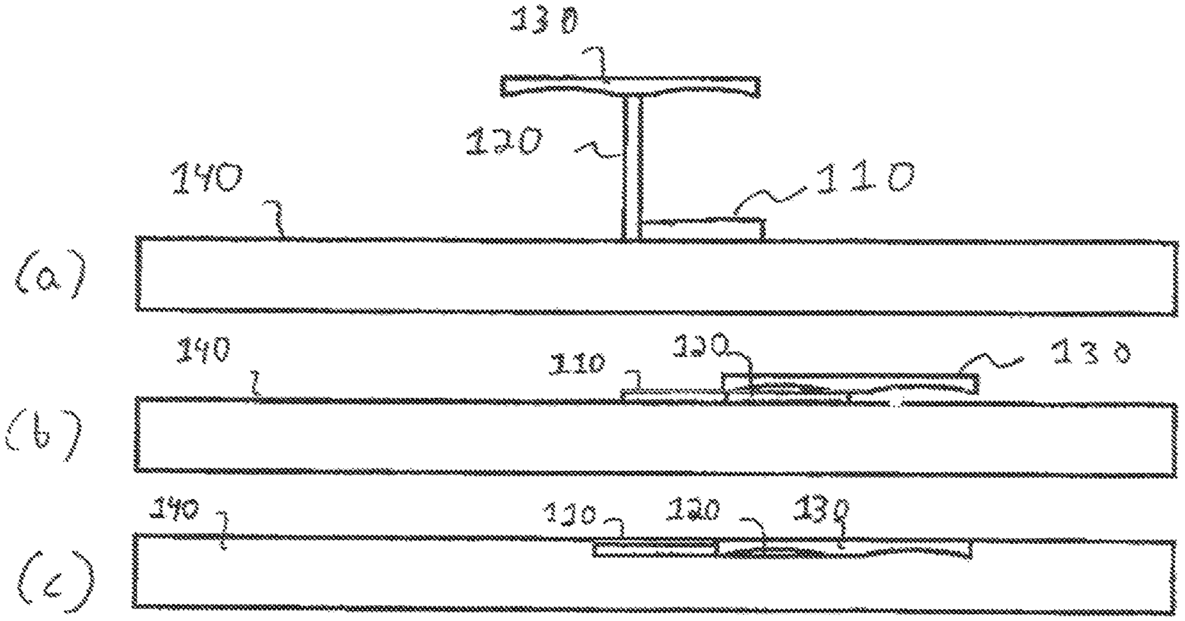

The extension 120 is positioned between the base 110 and grip 130. When the extension 120 is placed in a gripping orientation, the extension 120 provides a space between the base 110 and the grip 130, for allowing a user to insert at least one finger securely between the base 110 and the grip 130. Although the grip 130 illustrated in FIG. 2, for example, has a rectangular shape, various other shapes, such as a circle, ellipse, or other regular or irregular shapes including ergonomic shapes designed to comfortably fit over a user's fingers, may be used in accordance with embodiments of the present invention, such as illustrated in FIGS. 4, 5, and 6. An underside of the grip 130 may be flat, as illustrated in FIG. 7 or may have contours corresponding to curves of a user's finger or fingers while they are positioned to hold the handheld device 140 while using the grip device, such as illustrated in FIG. 8.

The extension 120 may be fixedly connected to the base 110 and the grip 130 in the gripping position. In this case, any of adjacent components from among the base 110, the extension 120, and the grip 130 may be manufactured as a single piece, or as a combination of a plurality of subcomponents. Alternatively, the entire grip device, may be manufactured as a single piece. The grip device may be constructed of various materials including hard and flexible materials, such as various metals, plastics, or textiles. In a case where the grip device is manufactures as a single piece, thickness of the material may vary in order for the grip device to be more flexible between the extension 120 and either of the base 110 and the grip 130 than the thickness of material in remainder of the grip device, in order to allow the grip device to move from an open position in which a user grips the handheld device 140 into a closed position for storage.

Figure 9:
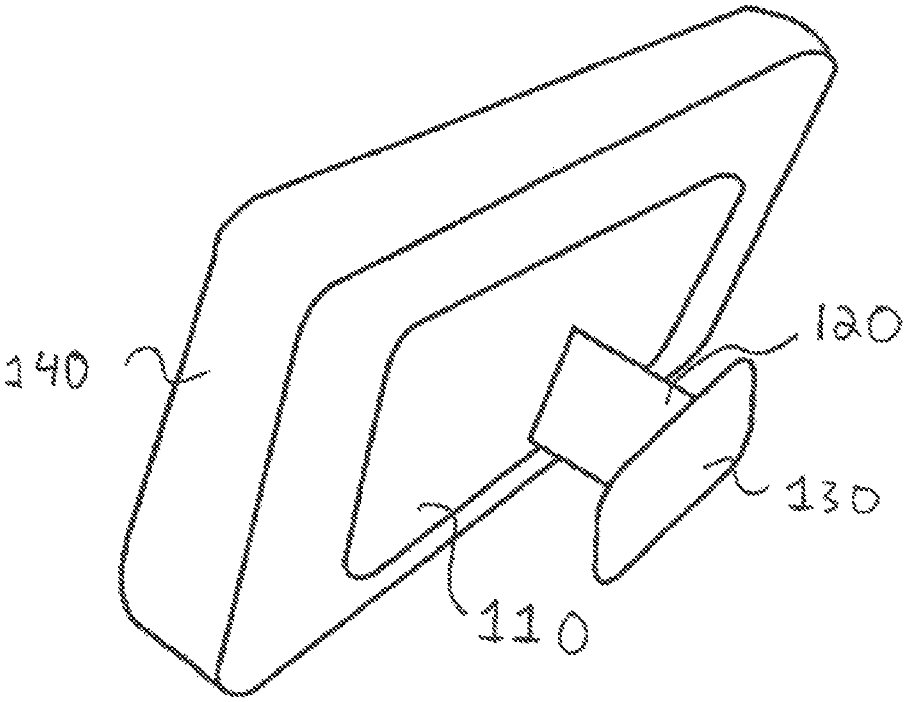
FIGS. 9 and 10 are diagrams illustrating a grip device used as a stand in accordance with an embodiment of the present invention.
Figure 10:
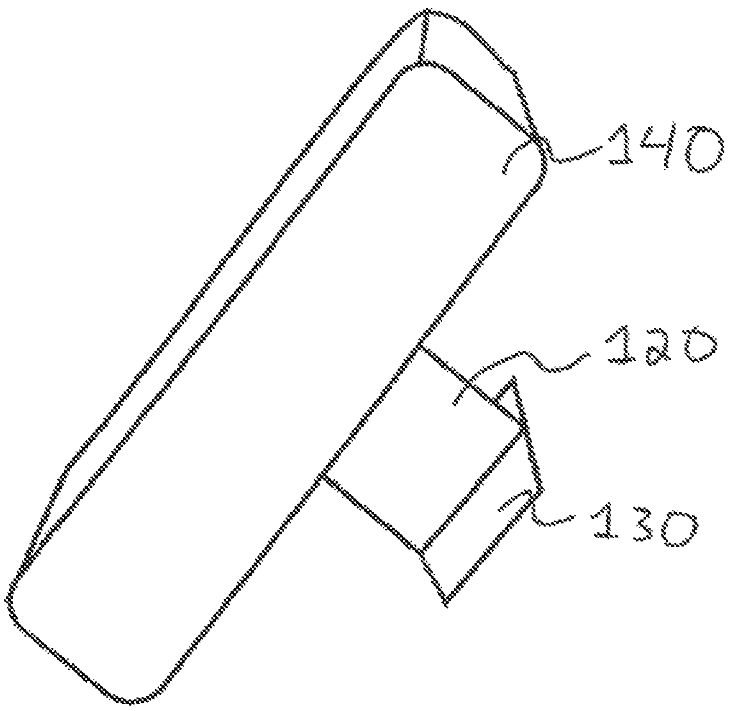

FIGS. 9 and 10 are diagrams illustrating a grip device used as a stand in accordance with an embodiment of the present invention.

Referring to FIG. 9, the grip device may be positioned on a surface, such as a table, with the grip device extended as a stand for the handheld device 140. For example, if the handheld device 140 has a display (not shown) on a side opposite a side where the grip device is positioned, the handheld device 140 may rest upon a surface at an angle advantageous for viewing images, multimedia, and/or accessing various user controls of the handheld device 140. As shown in FIGS. 9 and 10, according to an embodiment of the present invention, the grip device may rotate and/or be re-attached or repositioned with respect to the handheld device 140 such that the handheld device 140 may rest in a portrait and/or landscape orientation.

Although the extension 120 illustrated in FIGS. 7 and 8 is a single piece, the extension 120 may include a spring and/or telescoping pieces, or other similar mechanisms in order to adjust a distance between the grip 130 and the base 110 while the grip device is in an open position, an extended position, or intermediate positions between the open and extended positions, in a manner similar to that which is described hereinbelow with reference to FIGS. 18, 19, and 20, FIGS. 7(*b*) and 8(*b*) illustrate examples where the grip device rests on top the handheld device 140 while in a closed position, while FIGS. 7(*e*) and 8(*c*) illustrate alternate configurations where the grip device fits into a recess within the handheld device 140 in a closed position, such that an upper surface of the grip device in the closed position is substantially coplanar with an adjacent surface of the handheld device 140.

FIGS. 11 through 17 are diagrams illustrating grip devices that are movable from an open position into a closed position according to other embodiments of the present invention.

Figure 11:
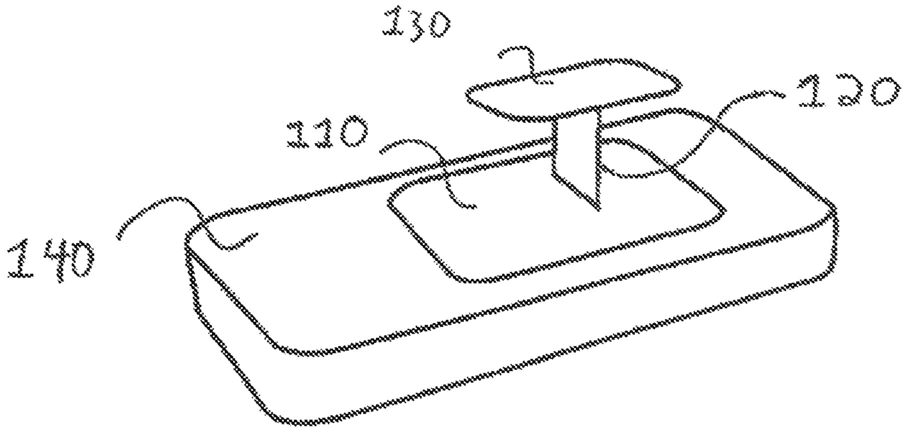
FIGS. 11 to 17 are diagrams illustrating grip devices that are movable from an open position into a closed position according to other embodiments of the present invention.
Figure 12A:
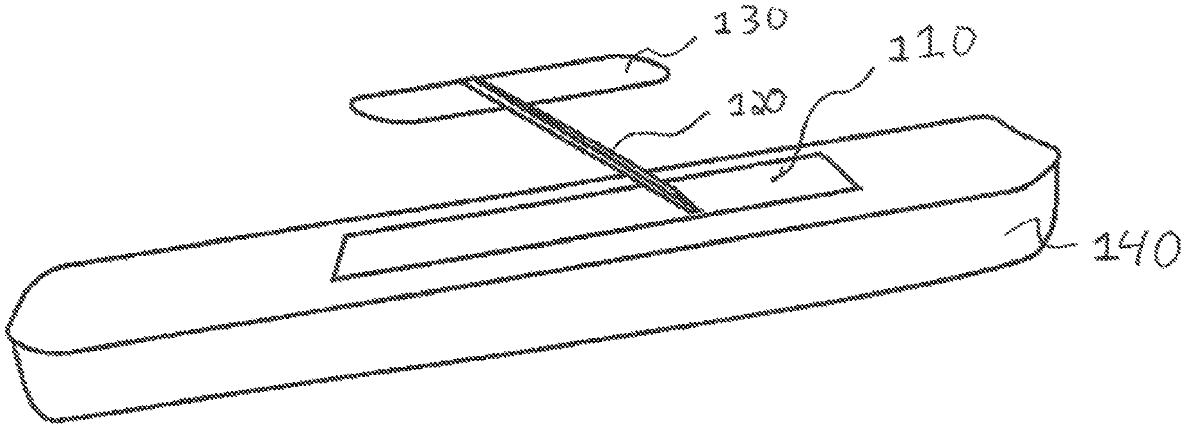
Figure 12B:
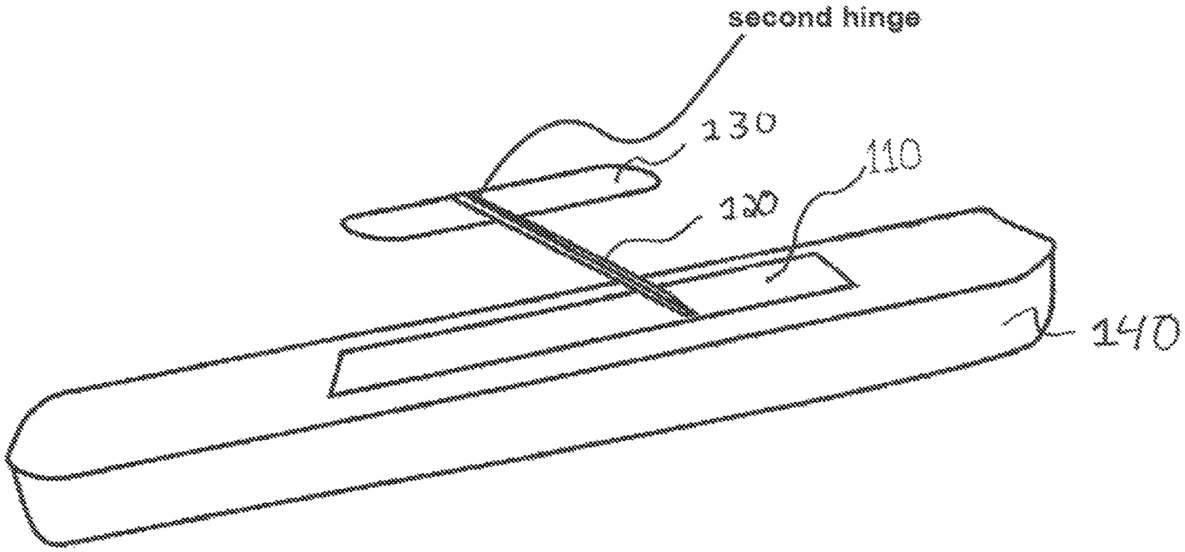
Figure 13:
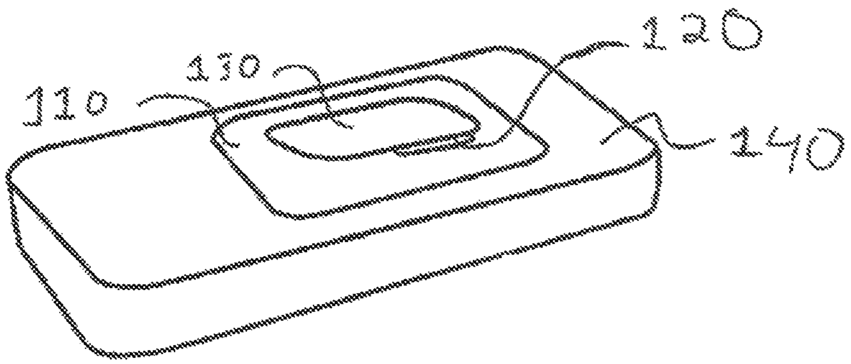
Figure 14:
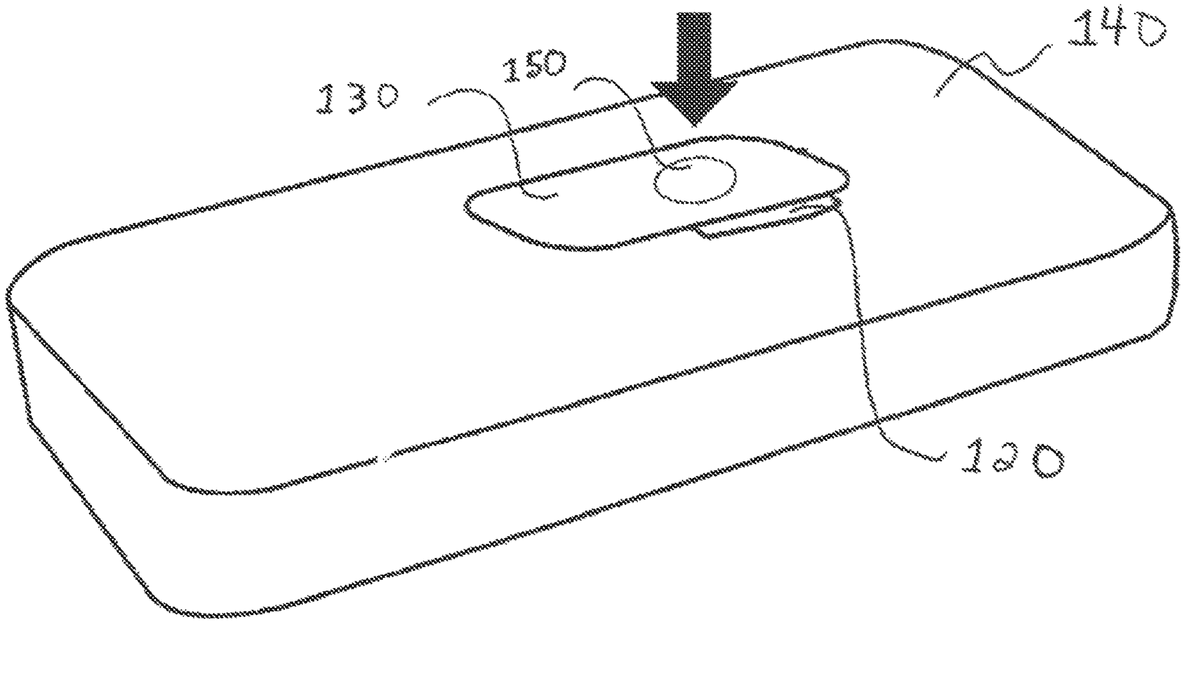
Figure 15:
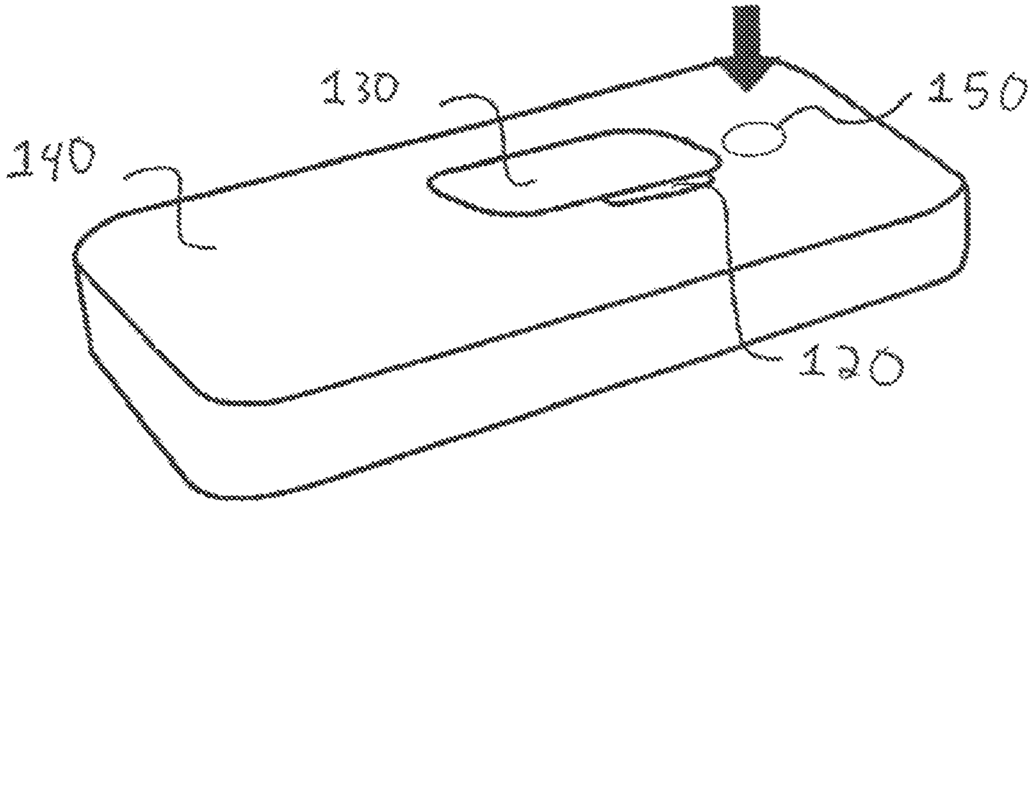
Figure 16:
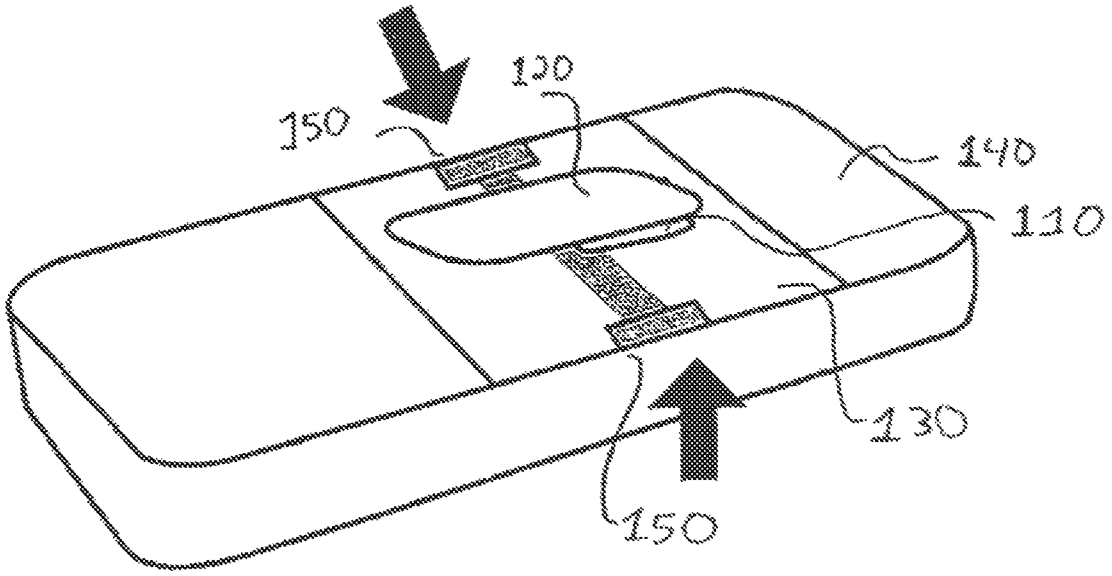
Figure 17:
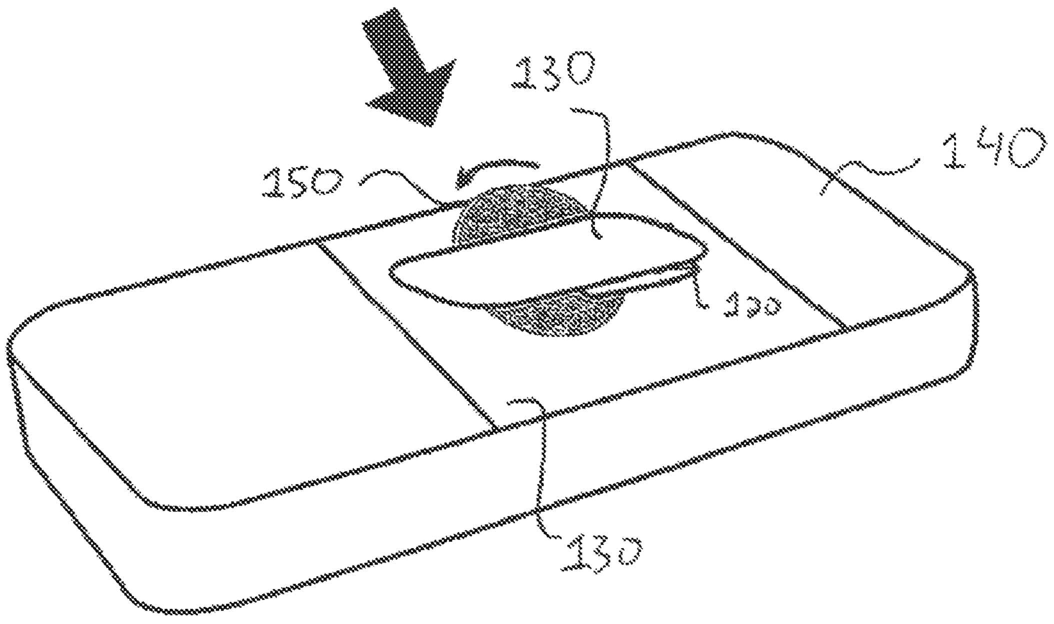

Referring to FIG. 11, an extension 120 of a grip device may be movably connected to the base 110 and grip 130 such that the grip device 140 may transition from the gripping position through an intermediate state illustrated in FIG. 12 into a closed position, as illustrated in FIG. 13. In the closed position, such as illustrated in FIG. 13, the extension 120 is rotated such that the grip 130 moves towards the base 110 while facing the base 110. The grip device may be affixed to the handheld device 140 such that the grip device protrudes from the exposed surface of the handheld device 140, but the present invention is not limited to this configuration. For example, according to embodiments of the present invention, in the closed position, an exposed surface of the grip 130 may be flush with the exposed surface of the handheld device 140.

The grip device may also include mechanisms for automatically opening and/or closing the device, such that automatic movement is assisted by springs, spring pins, or other such mechanisms. The mechanisms for opening and/or closing the device may be activated various latch mechanisms that would allow a user to open or close the device by pressing the grip device, or more specifically the grip 130 of the grip device, directly, and/or pressing a button dial, lever, trigger device, or squeezing/pulling one or more sides, etc. located on the grip device or the handheld device 140. FIGS. 14 through 17 illustrate locations of various latch mechanisms 150 for initiating a mechanism for opening and/or closing the grip device in accordance with embodiments of the present invention. The arrows in FIGS. 14 through 17 indicate directions in which the latch mechanism 150 may be moved in order to activate the mechanism for opening and/or closing the grip device. However, embodiments of the present invention are not limited to the directions indicated in these figures, and movements in other directions may be applied to the latch mechanism 150 in accordance with other embodiments of the present invention.

Figure 18:
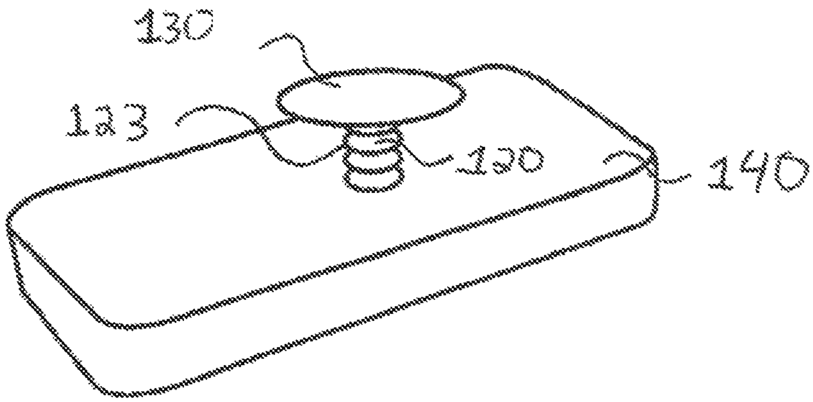
FIGS. 18 to 20 are diagrams illustrating a grip device according to other embodiments of the present invention, where a grip of the grip device moves away from abase of the grip device in a path, substantially perpendicular to the base.
Figure 19:
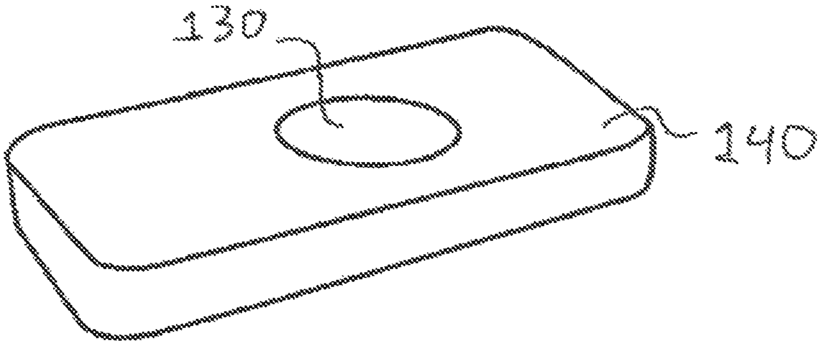
Figure 20:
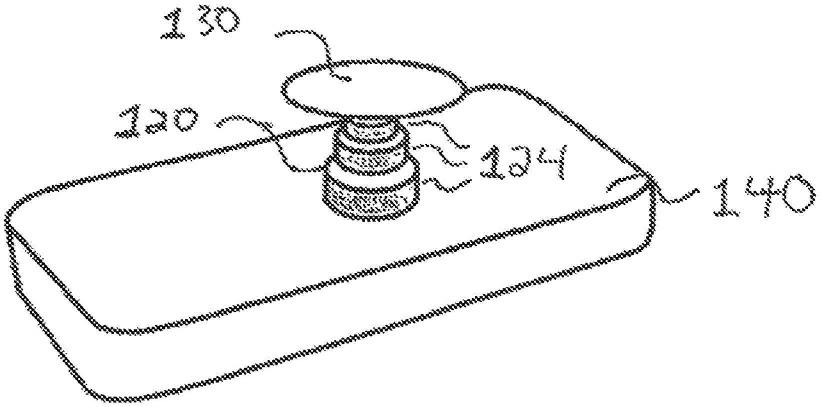

FIGS. 18 to 20 are diagrams illustrating grip devices according to other embodiments of the present invention, where a grip of the grip device moves away from a base of the grip device in a path substantially perpendicular to the base.

Referring to FIG. 18, the extension 120 may be formed such that it expands/collapses the grip device from the open position to the closed position, such that the grip 130 moves directly towards the base 110 without rotating. For example, as illustrated in FIG. 18, the extension 120 may include a spring 123. The spring may be positioned between to the base 110 and the grip 130 such that tension in the spring holds the grip device in the open position or holds the grip device in a closed position, such as illustrated in FIG. 19. When the spring 123 holds the grip device in the open position, a latch or other locking mechanism (not shown) may be used to hold the grip device in the closed position.

When the spring 123 holds the grip device in the open position, a locking device (not shown) may be used to hold the grip device in the open position, or the grip device may be forcibly held in the open position by placing at least one finger between the plate base 110 and the grip 130 while the grip device is in the open position, such that when the user removes the finger from the grip device, the spring 123 may automatically move the grip device from the open position to the closed position.

Although the extension 120 of FIG. 18 includes a spring 123 for automatically opening and the grip device, other mechanisms may be used to open/close the handheld device, such that the grip 130 moves directly towards the base 110. For example, the extension 120 may be formed as a slidable bar that slides, into a recess of the base 110, the grip 130, and/or the handheld device 140. In this case the extension 120 may be constructed as a single piece, or a series of telescopic pieces 124 that expand/collapse together as the grip device moves from the open to the closed position. Further, a spring (e.g., such as the spring 123 of FIG. 18) may be used in conjunction with a single piece sliding bar or the series of telescopic pieces 124 in FIG. 20.

Figure 21A:
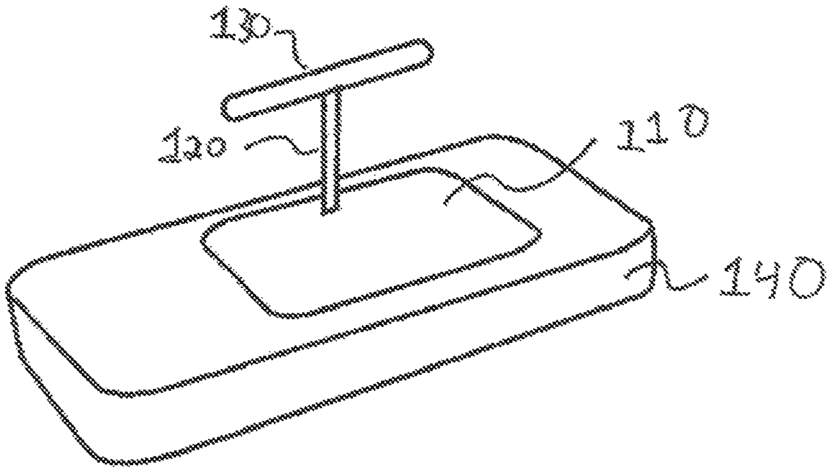
FIGS. 21*a*, 21*b*, and 22 are diagrams illustrating a grip device with a bar-style grip according to another embodiment of the present invention with a bar-style grip.
Figure 21B:
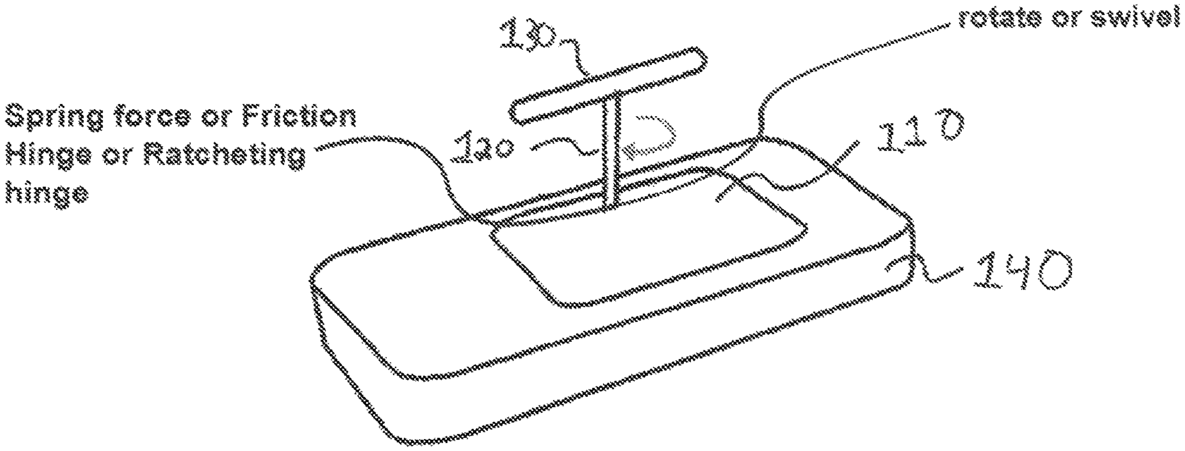
Figure 22:
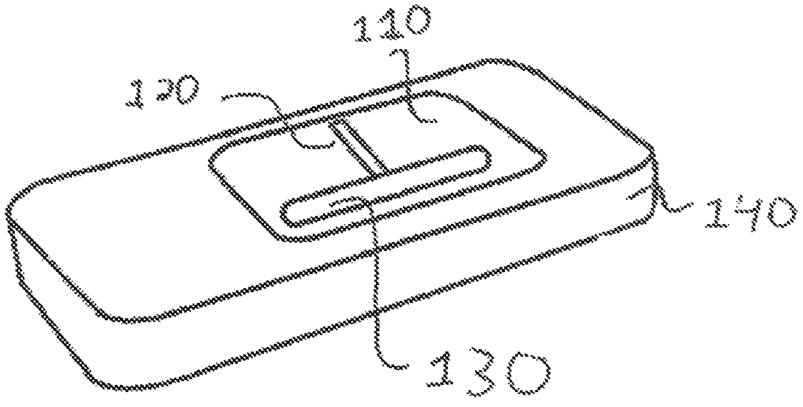

FIGS. 21 and 22 are diagrams illustrating a grip device with a bar-style grip according, to another embodiment of the present invention.

Referring to FIGS. 21 and 22, the grip 430 of the grip device is in the shape, of a bar, in contrast to the plate-style shapes of FIG. 1, for example. As illustrated in FIG. 21, when the grip device is in the open position, the handheld device 140 may be placed on a surface such as a table, with a grip 130 resting on the table such that a user may easily access a display and/or controls on a side of the handheld device 140 while the handheld device 140 is resting on the table, in the same manner as embodiments of the invention described with reference to FIGS. 9 and 10. Although the grip 130 is illustrated as having a ‘T’ shape, an ‘L’ shaped grip, or other shapes, may alternatively be provided in accordance with various embodiments of the present invention.

Figure 23:
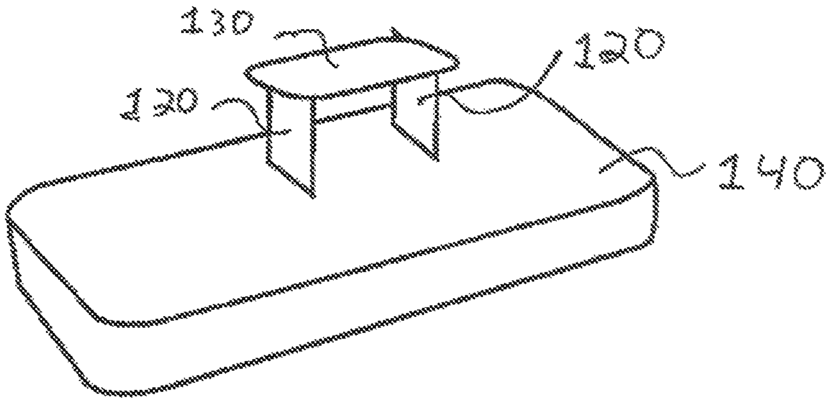
FIGS. 23 to 25 are diagrams illustrating a grip device with two extensions according to another embodiment of the present invention.
Figure 24:
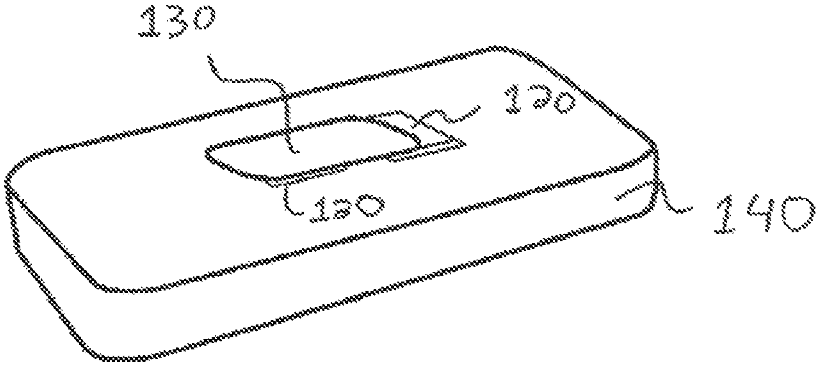
Figure 25:
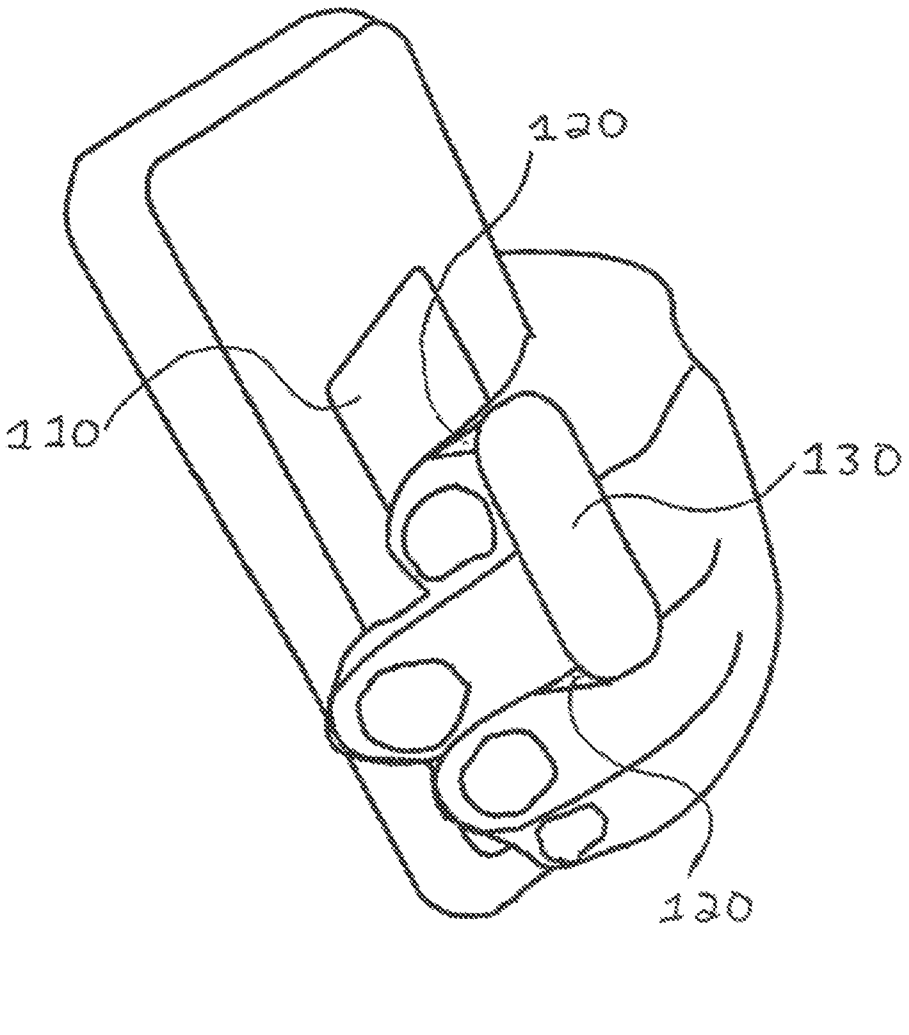

FIGS. 23 to 25 are diagrams illustrating a grip device with two extensions according to another embodiment of the present invention.

Referring to FIGS. 23 to 25, a grip device according to an embodiment of the present invention may include a plurality of extensions 120 connecting a base 110 to a grip 130. Although two extensions 120 are illustrated in FIGS. 23 to 25, any number of extensions may be provided in accordance with embodiments of the present invention. The plurality of extensions 130 provide additional stability, and in an open state, a distance between adjacent extensions 130 may provide space to accommodate one or more fingers, as illustrated in FIG. 25.

Figure 26:
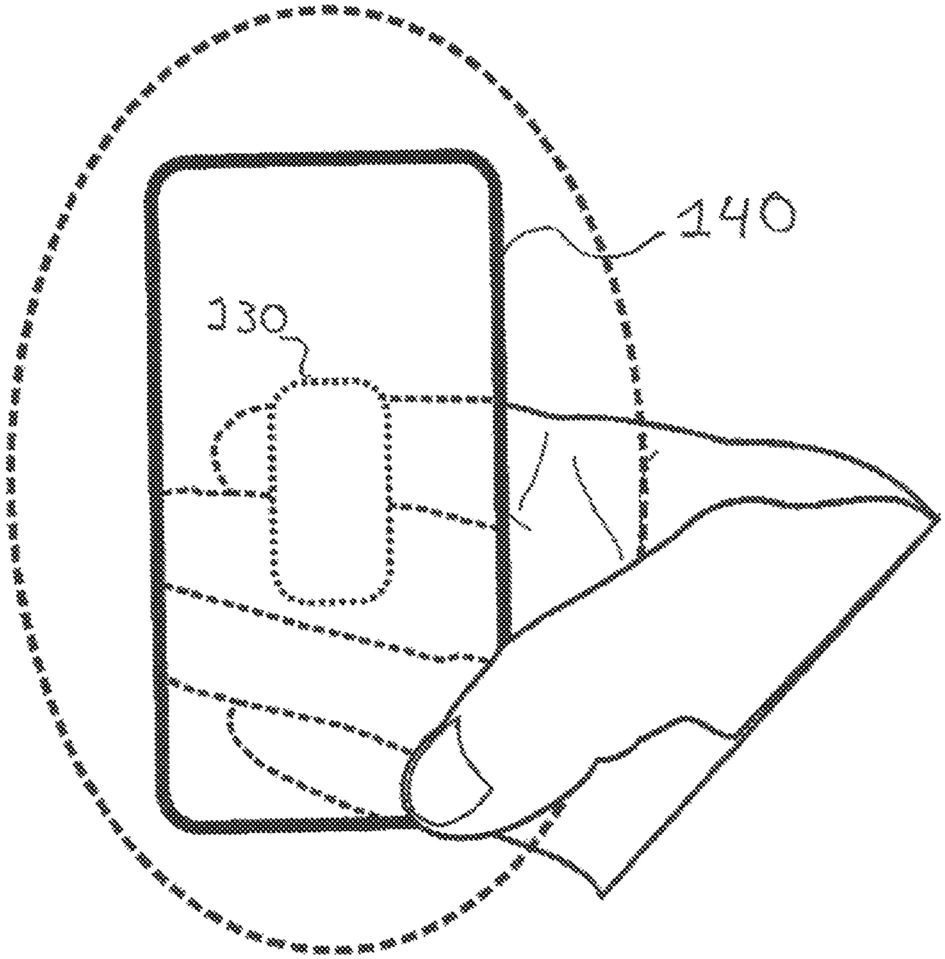
FIG. 26 is a diagram illustrating a range of motion of a user's thumb while using a grip device according to another embodiment of the present invention.

FIG. 26 is a diagram illustrating a range of motion of a user's thumb while using a grip device according to another embodiment of the present invention.

Referring to FIG. 26, when a user grips a handheld device 140 while using a grip according to an embodiment of the present invention, a user may securely grip the handheld device 140 while the ends of the user's fingers rest on a back of the device. In FIG. 1, for example, with a conventional apparatus, the joints connecting the user's fingers to his/her hand are positioned along a back surface of the device 10, when a user securely grips the handheld device 10.

By contrast, as shown in FIG. 26, when the user grips the handheld device 140, the finger joints are positioned beyond a side of the handheld device 140, allowing these joints to move freely. Therefore, a grip device according to an embodiment of the 25 present invention frees a users fingers to bend at the joints connecting his fingers to his hand and increases a range of motion of the user's thumb with respect to the handheld device 140.

Figure 29:
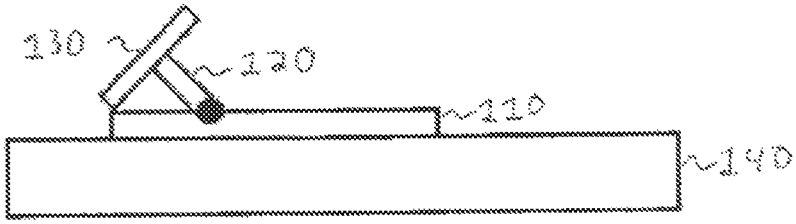
Figure 30:
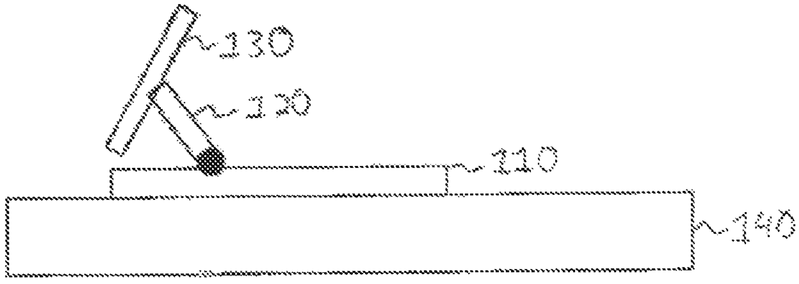
Figure 31:
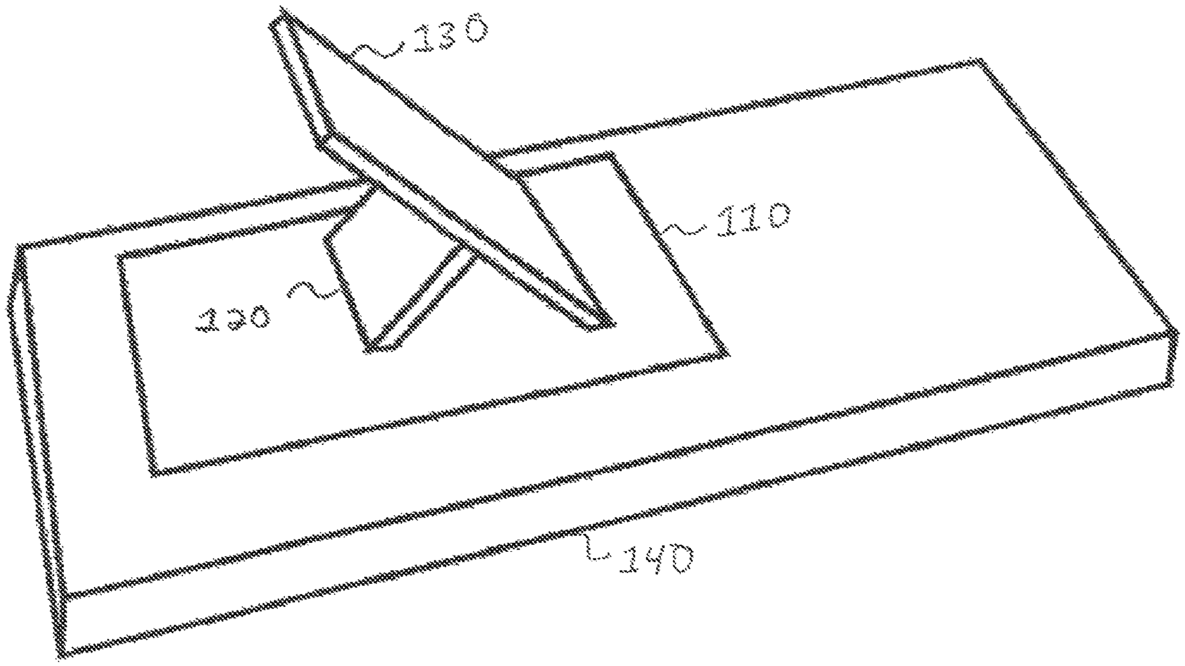
FIG. 31 is a diagram illustrating a perspective view of the grip device of FIG. 28.

FIGS. 27 to 30 are diagrams illustrating a side view of a grip device with an angled grip according to another embodiment of the present invention. FIG. 31 is a diagram illustrating a perspective view of the grip device of FIG. 28.

Figure 27:
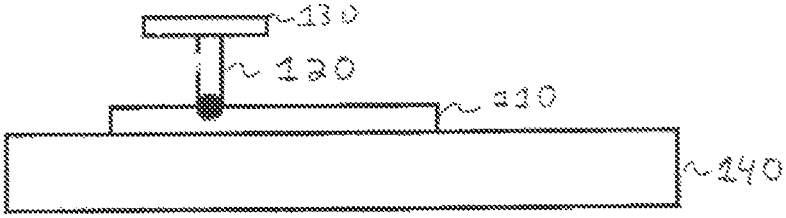
FIGS. 27 to 30 are diagrams illustrating a side view of a grip device with an angled grip according to another embodiment of the present invention.
Figure 28:
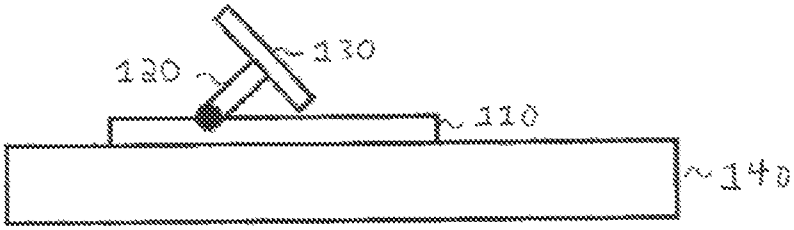

FIG. 27 illustrates a grip device according to another embodiment of the present invention in a neutral opened position, wherein grip 130 is oriented substantially parallel to the base 130. The grip 130 may also be positioned in either of two angled open positions, such as illustrated in FIGS. 28 and 29. More specifically, while the extension 120 is oriented away from the base 130, such as in a direction substantially perpendicular to the base 130, one end of the grip 130 is pointed towards and rests against the base 130, while an opposite end of the grip 130 is pointed away from the base 130.

In the angled open positions of FIGS. 28 and 29 the end of the grip 130 pointing away from the base 110 extends further away from the base than when the grip is in neutral open position of FIG. 27, a user may selectively position the grip 130 in either of the neutral open position of FIG. 27 or the angled open positions of FIGS. 28 and 29 in order to adjust a viewing angle of the handheld device 140, when the handheld device 140 is freely resting upon a surface such as a table. Although only two angled open positions are illustrated in FIGS. 28 and 29, the grip 130 may be positioned at other angles in accordance with embodiments of the present invention.

A hinge (not shown) connecting the grip 130 to the extension 120 may be a friction hinge and/or a ratcheting hinge designed to intermittently lock the grip 130 at each of the neutral open position of FIG. 28 and/or each of the angled open positions of FIGS. 28 and 29. Alternatively, the grip 130 and the extension 120 may be held in place at any angle through friction within the hinge and/or directly between the grip 130 and the base 120. Although only three angled positions are illustrated in FIGS. 28 and 29, a locking hinge may lock the grip 130 at other angles with respect to the extension 120 in accordance with embodiments of the present invention.

Further, a hinge (not shown) connecting the extension 120 to the base 110 may also be a friction hinge and/or include locking mechanisms to support the extension 120 angled at a position substantially perpendicular to the base 110 or other angles. Therefore, the grip 130 may be oriented in a variety of positions in which one end of the grip 130 is resting against the base 110, as well as positions in which no ends of the grip 130 are resting against the base 110, as shown in FIG. 30.

Figure 32:
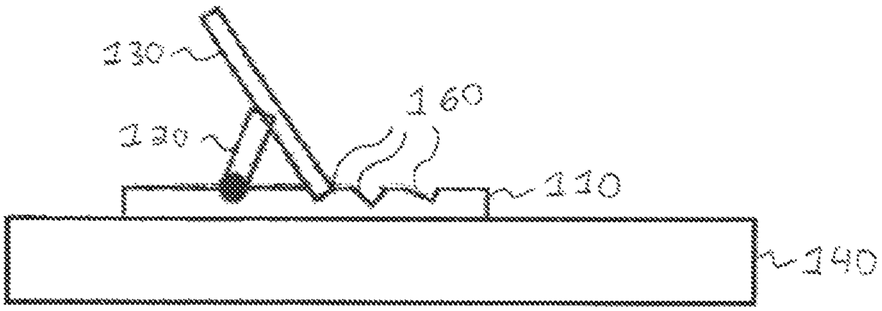
FIGS. 32-34 are diagrams illustrating a side view of a grip device with an angled grip and recessed locking grooves according to another embodiment of the present invention.
Figure 33:
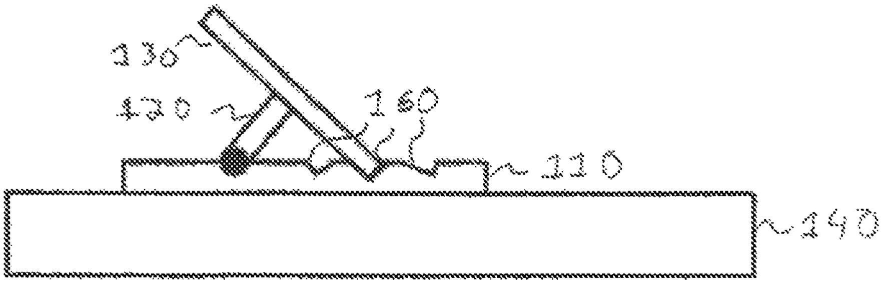
Figure 34:
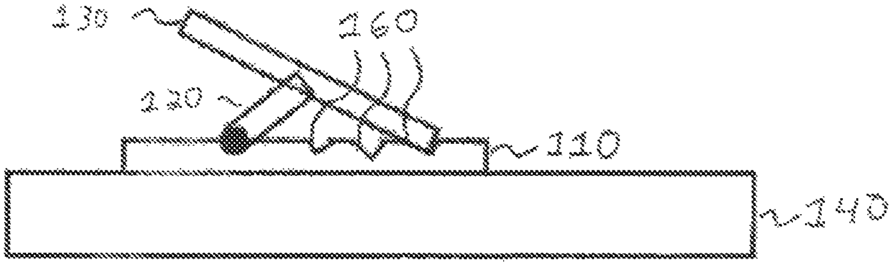

FIGS. 32-34 are diagrams illustrating a side view of a grip device with an angled grip and recessed locking grooves according to another embodiment of the present invention.

Referring to FIGS. 32-34 in addition, to, or as an alternative to a locking hinge, the base 110 may include one or more recessed grooves 160, each configured to receive a respective end of the grip 130. Although in FIGS. 32-34, grooves are depicted on, one side of the base 110 one or more grooves 160 may be provided on either or both sides of the base 110, in order to support the grip 130 at various angles with respect to the base 110, in accordance with embodiments of the present invention.

Although the embodiments of the present invention illustrated in FIGS. 27 to 34 include a grip, base, and extension similar to that illustrated in FIG. 2 of the present application, for example, the angled positioning feature may be utilized with any of the embodiments of the present invention. In particular, grip device with an angled grip, such as illustrated in FIGS. 27 to 34 may be rotated and/or repositioned with respect to a handheld device 140 such as illustrated in FIGS. 9 and 10, in order to further increase positioning options for further adjusting viewing angles of the handheld device 140 resting in either of a portrait or landscape orientation.

As shown above, embodiments of the present invention allow a user to more easily access controls such as a touch screen on a front or sides the handheld device 140 with a user's thumb, without a need to reposition the handheld device with respect to the user's hand, thereby enabling secure one-handed operation of the handheld device 140.

Although various embodiments of the invention are herein described and illustrated with various forms of bases, extensions, grips, and handheld devices, the specific embodiments of each component described herein are provided as examples and the present invention is not limited to only these embodiments. More specifically bases, extensions, and grips within grip devices of any of the described embodiments may be interchanged with other bases, extensions, and grips in accordance with other embodiments of the invention, and may be used in conjunction with any of a variety of handheld devices including the handheld devices described and illustrated herein.

While the invention has been shown and described with reference to certain exemplary embodiments thereof, it will be understood by those skilled in the art that various changes in form and details may be made therein without departing from the spirit and scope of the invention.

What is claimed is:

1. A one hand gripping apparatus attached to the back of a handheld device or its case consisting essentially of, a one hand gripping apparatus attached to the back of a handheld device, a base is fastened or built into, the back of the hand-held device or its case, an extension is attached to the base by a hinge, the hinge is attached to the base, attached or built in on the opposite end of the extension from the hinge is a grip that extends wider than the extension on at least two opposite sides, the grip extends wider in the direction of the outside sides of the received fingers, the received fingers are two adjacent non-thumb fingers of a gripping hand inserted between handheld device and the grip, each received finger straddling the outside of the extension, the hand-gripping apparatus consisting essentially of one or more of the following features;

the hinge has a friction force on the swinging extension, the hinge has a ratcheting hinge on the swinging extension, the hinge swivels or rotates on the base, the hinge has a spring force for pushing and/or pulling the extension, a locking mechanism to stay in an expanded and/or collapsed position, the grip is attached by a second hinge the apparatus in the collapsed position lies flat to the handheld device.

2. A method using a collapsing and expanding one hand gripping apparatus and fastening the handgrip apparatus to the handheld device or handheld device's case, the method comprising the steps of:

obtaining a collapsing and expanding one hand gripping apparatus as recited in claim 1, fastening or building the hand gripping apparatus into the back of a handheld device or back of the hand-held device case, in the expanded position swinging away from the hand held device, receiving two adjacent non-thumb fingers of a gripping hand inserted between handheld device and the other end of the apparatus, each received finger straddling the sides of the apparatus, finger print side of fingers facing hand held device and in contact with the apparatus and/or back of handheld device or case of handheld device, gripping hand's thumb and portion of palm wrapping around to the front of the handheld device, a step in the apparatus collapsing is removing the fingers of the gripping hand from the apparatus and the apparatus lying flat to the handheld device.

* * * * *